Aug. 7, 1945.   E. H. R. PEGG ET AL   2,380,992
ELECTRICAL DUST-PRECIPITATOR SYSTEM AND
INTERCHANGEABLE PARTS THEREFOR
Filed Oct. 8, 1943   5 Sheets-Sheet 2

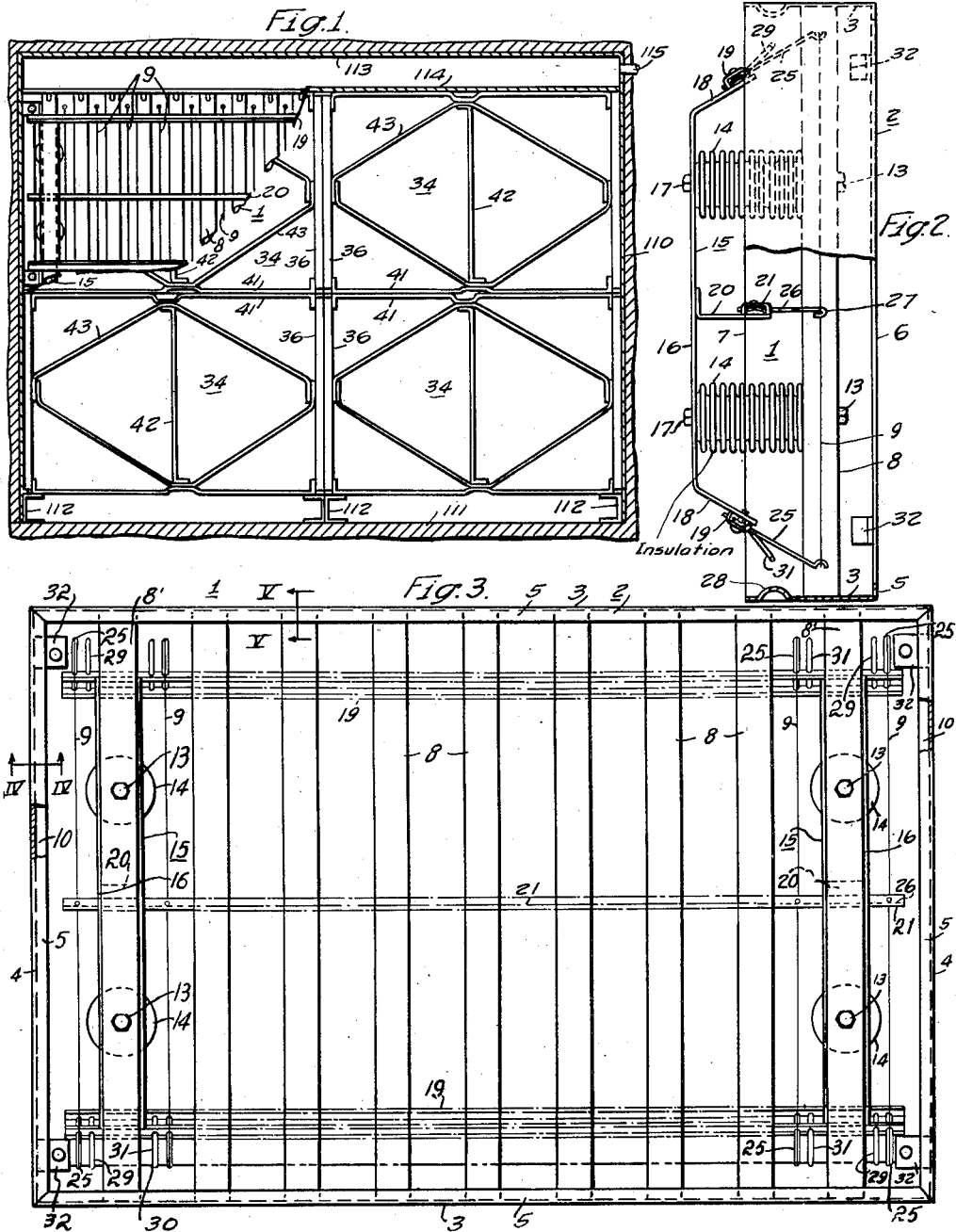

WITNESSES
Leon M. Garman

INVENTOR
Edward H. R. Pegg
and Ira R. Cummings.
BY
B. L. Zangwill
ATTORNEY

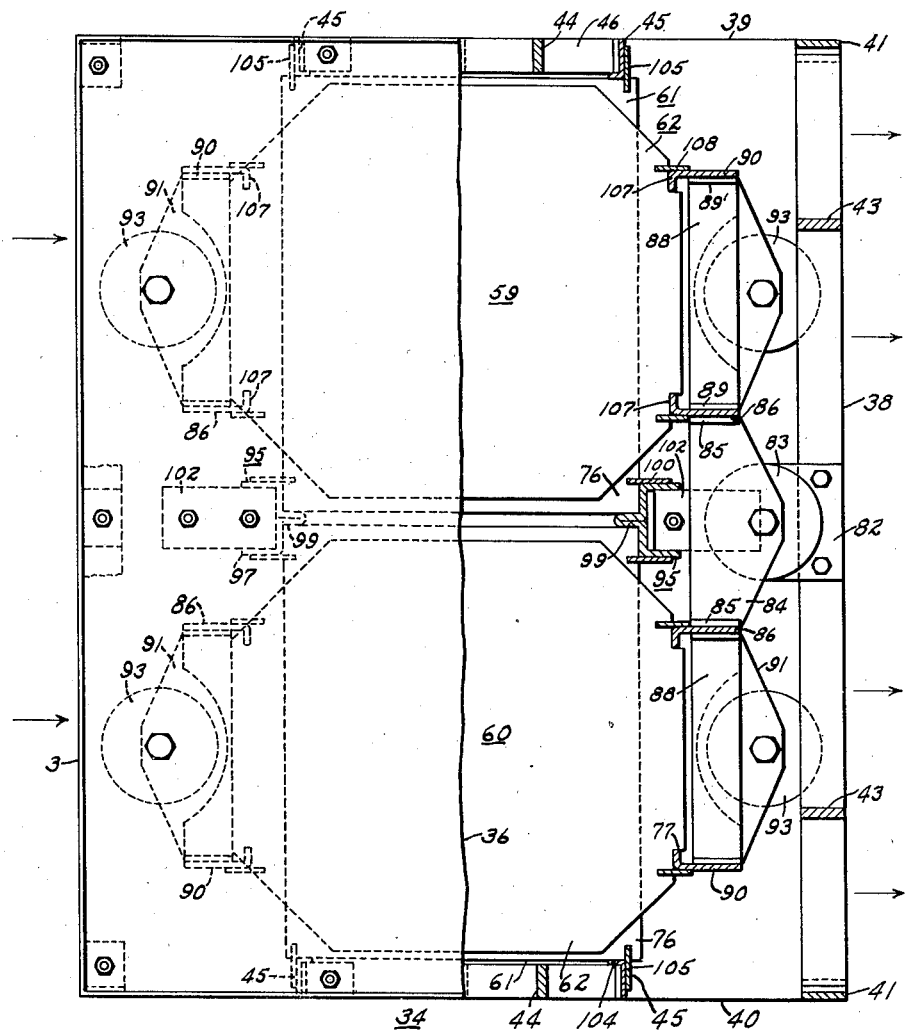

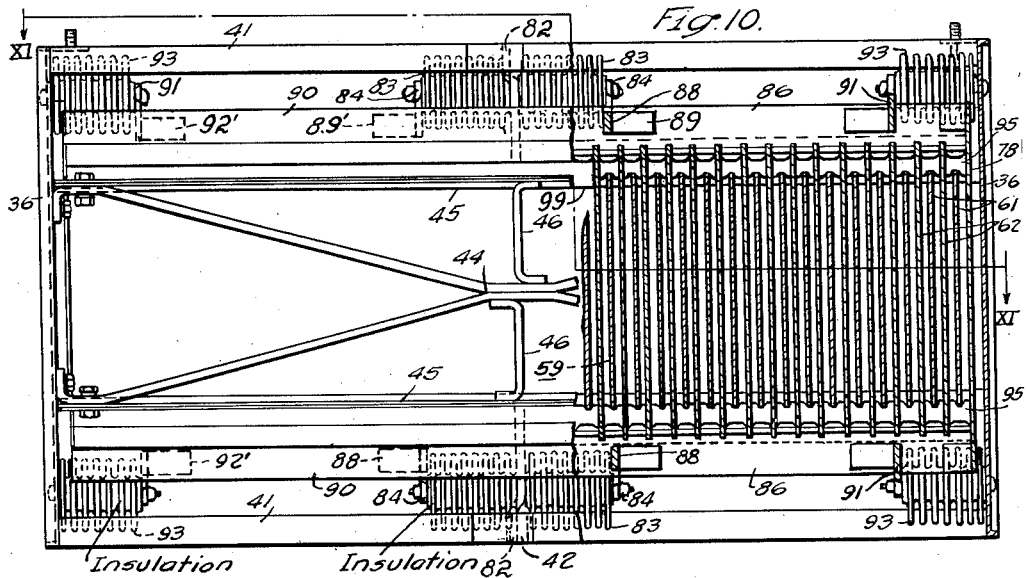
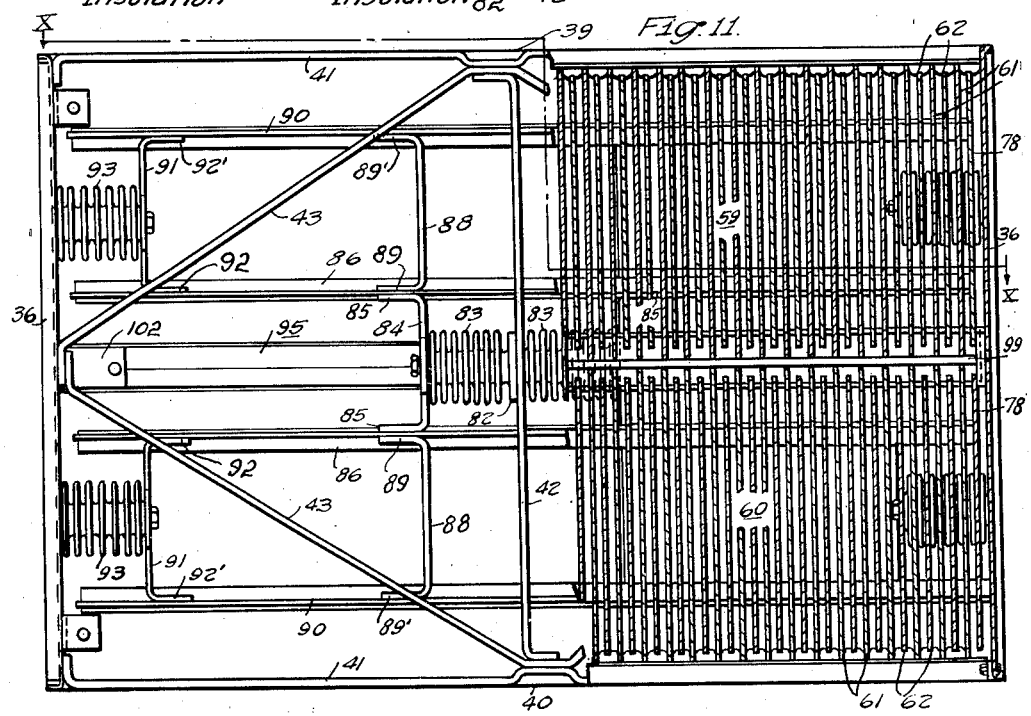

Aug. 7, 1945.   E. H. R. PEGG ET AL   2,380,992
ELECTRICAL DUST-PRECIPITATOR SYSTEM AND
INTERCHANGEABLE PARTS THEREFOR
Filed Oct. 8, 1943   5 Sheets-Sheet 5
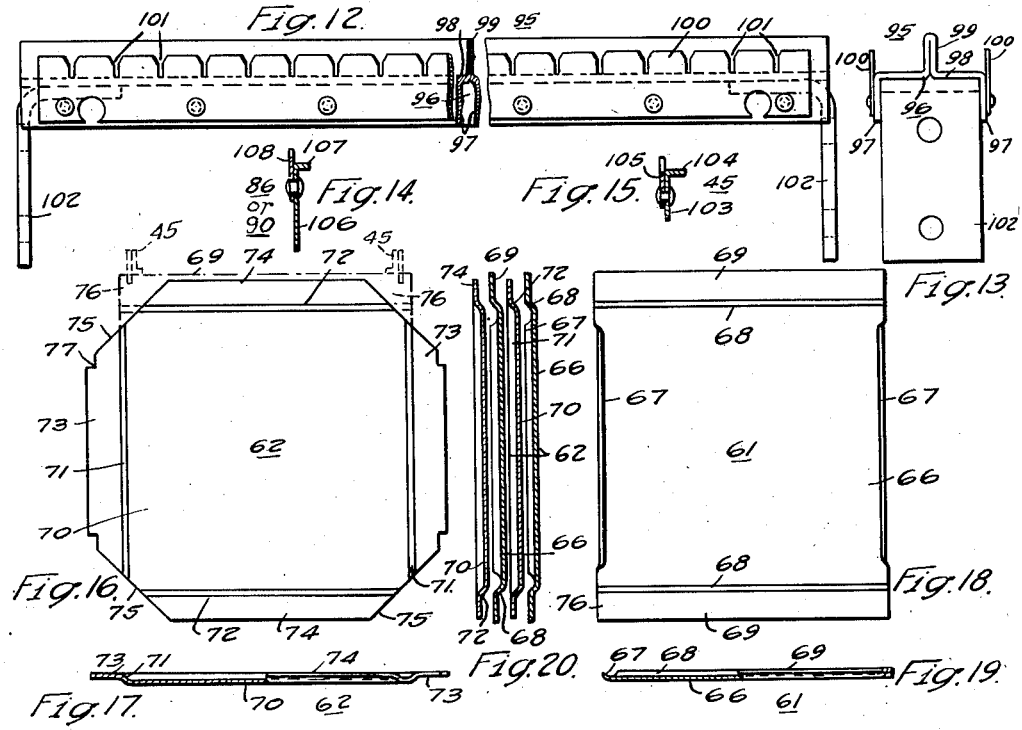
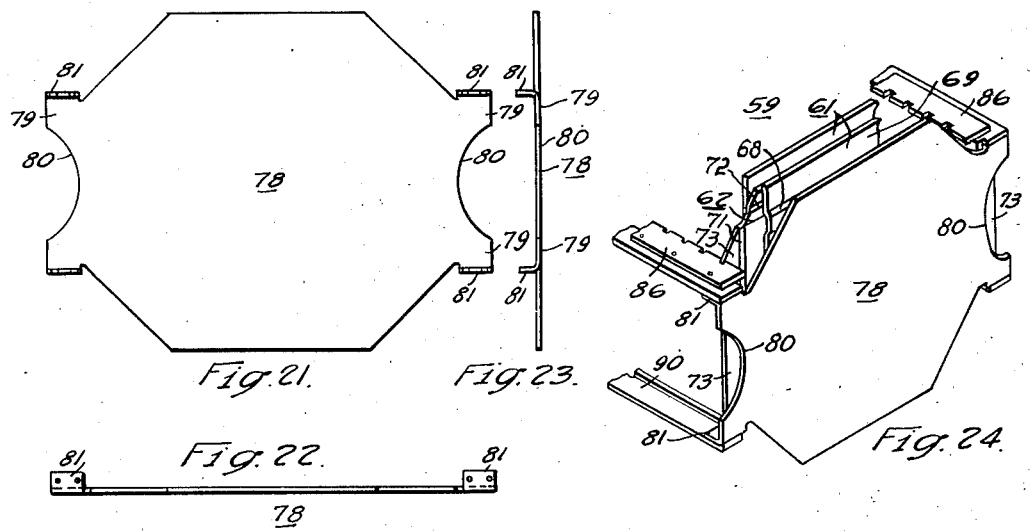
WITNESSES:
INVENTORS
Edward H. R. Pegg
and Ira R. Cummings.
BY
ATTORNEY Patented Aug. 7, 1945

2,380,992

UNITED STATES PATENT OFFICE 2,380,992

ELECTRICAL DUST-PRECIPITATOR SYSTEM AND INTERCHANGEABLE PARTS THEREFOR

Edward H. R. Pegg and Ira R. Cummings, Lakewood, Ohio, assignors to Westinghouse Electric Corporation, East Pittsburgh, Pa., a corporation of Pennsylvania Application October 8, 1943, Serial No. 505,466

21 Claims. (Cl. 183—7)

Our invention relates, generally, to electrical dust-precipitator systems for electrically removing dust-particles from flowing gaseous atmospheres; by dust-particles and related terms meaning any particulate matter contained or suspended in the gaseous medium, which can be removed by electrostatic dust-precipitating means and methods.

More particularly, our invention relates to gas-cleaning means of a type in which a gas-stream is cleaned by first passing it through an ionizing electrostatic field in which gas-borne dust-particles are charged, and then passing the gas-stream, carrying the charged dust-particles, through essentially a non-discharging electrostatic field which separates the charged dust-particles from the gas-stream by causing migration to a receiving-electrode on which the dust may collect.

In a preferred form of our invention, a suitable dust-charging ionized electrostatic field is established between relatively widely spaced rounded electrodes alternately of relatively small curvature and large curvature; and a suitable dust-precipitating non-discharging electrostatic field is established between each pair of a plurality of alternately relatively insulated and uninsulated electrodes in the form of flat, curved or bent plates relatively closely spaced transversely across the gas-steam, and of sufficient length longitudinally therealong to remove the charged dust-particles with satisfactory cleaning efficiency for the gas flow-velocity. Further operating and general physical characteristics of such an electrical precipitator, especially suited for cleaning air, are shown and claimed in United States Patent No. 2,129,783 of September 13, 1938, issued to Gaylord W. Penney, to which reference may be made for further details.

For commercial applications which require the cleaning of large volumes of gas, it has been the practice to make standardized interchangeable unit-parts or gas-cleaning cells which could be conveniently assembled side by side at a particular installation, the number of unit-parts or cells so assembled being determined by the required gas-cleaning capacity. Different forms of prior structures are described in the Pound et al. U. S. Patent No. 2,212,885 of August 17, 1940, and E. H. R. Pegg U. S. Patent No. 2,215,298 of September 17, 1940.

It is an object of our present invention to provide a form or forms of unit-parts of a type described which can be economically manufactured; which can be easily but solidly assembled with any desired number of other or associated units; which is rugged but not cumbersome to handle; which can be easily treated for cleaning and the like; and which has other desirable advantages and features.

A very important object of our invention resides in the provision of a commercially utilizable electrical dust-precipitator which can be built from mass-produced parts of non-critical and relatively cheap materials, but which, nevertheless, has a smaller cost and weight for a predetermined cleaning efficiency per unit volume of gas treated per unit time, than any other electrical precipitator for the same primary purpose of which we are aware. This saving in weight is as much as 25% or more.

To this end, our invention, in addition to the foregoing, comprises other features and details including novel forms and arrangements of the plate-electrodes and supporting means therefor, ionizing-wire supporting structure and similar details, cooperating to produce interchangeable unit-parts of simplicity, adaptability, and economy of cost and upkeep.

According to a preferred form of our invention, which is particularly suitable for cleaning a substantially horizontal gas-flow, the dust-charging means and the dust-precipitator means are embodied in separate but fittable structures or units which can be secured together; the dust-charging unit comprising a casing-frame having four closed sheet-metal sides and opposite open transverse sides through which the gas flows; and the dust-precipitator unit comprising a rigid six-sided frame of sufficient strength to support a plurality of similar frames superimposed thereon, and plate-electrodes upstandingly or vertically supported inside the frame for precipitating the charged dust-particles. Each frame has opposite open sides for the entering and leaving gas; and upper and lower open sides for providing, in each tier, an open bottom in a relatively upper frame contiguous to an open top in the relatively lower frame. Such construction permits cleaning or coating liquid introduced at the top of an assembled tier of frames to flow downwardly through all of its frames.

By providing separate dust-precipitator units and dust-charging units, we can incorporate into each many advantageous features.

Thus, we divide a dust-precipitator unit into a plurality of dust-precipitating means each comprising a set of relatively insulated and uninsulated plate-electrodes, the sets being arranged transversely side by side. By this expedient, the size of the plate-electrodes can be limited, thereby reducing, to a large degree, the troublesome problems of supporting the plate-electrodes without buckling, of adapting coated sheet-iron for use as plate-electrodes, of imparting rigidity and satisfactory flatness to them, of limiting their vibration in operation, and similar features, so that, in general, manufacturing and fabricating costs are reduced. Another important advantage resides in the close mating of the shapes or forms of the plate-electrodes, so that an increased space-factor can be devoted to dust-precipitating electrostatic fields bounded by the plate-electrodes.

In the independent dust-charging units, the ground-electrode lengths can be made of advantageous size, irrespective of the size of the dust-precipitator frames, so long as a number of dust-charging units can be assembled to fit the same or a different number of dust-precipitator units. By having the dust-charging structure comprise an outer casing-frame of rigid sides, at least one pair of which spans a plurality of dust-precipitator units to which the dust-charging unit can be secured, additional rigidity can be imparted to the assembled gas-cleaning means.

Other objects, features, combinations, subcombinations, innovations and elements of our invention will be discernible from the following description thereof, which is to be taken in connection with the accompanying drawings. The drawings are on varying scales, and in some of the figures thereof parts and details have been omitted for clearness of illustration. In these drawings:

Figure 1 is a schematic view transversely through a gas-duct, including a gas-cleaning assembly embodying our invention; the view showing a plurality of assembled dust-precipitator units and part of a dust-charging unit;

Fig. 2 is an end view, partly in section, of the dust-charging unit;

Fig. 3 is an elevational view of the dust-charging unit, looking backward in the direction of gas-flow;

Figs. 6 and 7 are sectional views, partly in elevation, at right-angles for showing a manner in which an end of a ground-electrode is fastened to the ionizer casing-frame side of which Fig. 5 is a section;

Fig. 9 is an end view, partly in section and partly in elevation, substantially along the line IX—IX of Figure 8, of the dust-precipitator unit, the left side of this figure illustrating only parts at or near the associated end-side of the unit;

Figs. 10 and 11 are, respectively, a plan view and an elevational view of the dust precipitator unit, partly in section, substantially on the section lines X—X and XI—XI of each other;

Fig. 12 is a broadside view, with parts broken away, of a bar for positioning ground plate-electrodes of the dust-precipitator unit;

Fig. 13 is a transverse end view thereof;

Figs. 14 and 15 are transverse sectional views of different forms of bars for positioning the insulated, high-voltage plate-electrodes and the uninsulated ground plate-electrodes, respectively;

Figs. 16 and 17 are, respectively, a broadside view and an end view, partly in section, of a high-voltage plate-electrode, a portion of a ground plate-electrode and a pair of spacer-bars therefor being shown dotted in Fig. 16 for indicating the assembled relation of the plate-electrodes;

Figs. 18 and 19 are, respectively, a broadside view and an end view, partly in section, of a ground plate-electrode;

Fig. 20 is a sectional view, at right-angles to the edge views of Figs. 17 and 19, showing a relationship of the high-voltage and ground plate-electrodes as assembled;

Fig. 21 is a broadside view of an insulated high-voltage end plate-electrode;

Figs. 22 and 23 are end views thereof at right-angles to each other; and

Fig. 24 is a diagrammatic perspective part view of a few of the plate-electrodes including an insulated end plate-electrode, showing the manner in which they are assembled.

Dust-charging or ionizing structural unit

Figure 4:
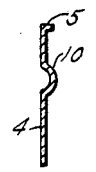
Figs. 4 and 5 are sectional views of ionizer casing-frame sides of a dust-charging unit, substantially on the section lines IV—IV and V—V, respectively, of Fig. 3.
Figure 5:
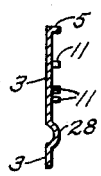
Figure 6:
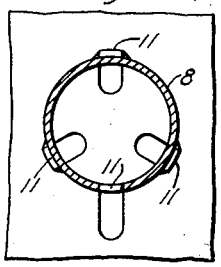
Figure 7:
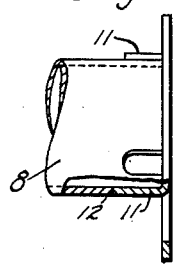

Referring more particularly to Figs. 2 through 7, the dust-charging means or unit is indicated in its entirety by the reference numeral 1. It comprises a rectangular sheet-metal ionizer outer casing-frame 2 having a pair of like opposed sides 3 and a transverse pair of like opposed sides 4, provided with an integral short flange 5 projecting inwarly from the casing-frame sides on the downstream edges thereof; the flange bounding an open downstream transverse casing-frame side 6 opposite to another open transverse upstream casing-frame side 7, through which the gas may flow. The casing-frame supports a plurality of spaced hollow curved ground-electrodes 8 between the spaces of which are strung ionizing-wires 9. The ground-electrodes 8 are transversely across the path for the gas-stream, being parallel to the casing-frame sides 4 which are provided with integral semi-cylindrical curved side-portions 10 aligned with the ground-electrodes and serving a similar function.

The ends of the ground-electrodes are secured to the casing-frame sides 3 which are provided with spaced sets of lugs therefor, each set comprising four lugs 11 arranged in a loop for securing a ground-electrode end. The lugs are formed by lancing each casing-frame side 3, the cuts for the downstream lugs being inside that portion of the casing-frame side 3 which will be covered by a ground-electrode end. Each ground-electrode end is formed with a cutout slot 12 which can slip around a lug so that the ground-electrode can be slid into place by twisting the electrode. Once in position, the cutout slot 12 fits an upstream lug, so that it is closed.

A pair of separated ground-electrodes, in this particular instance the end ground-electrodes 8' which are closest to the casing-frame sides 4, are each provided with a plurality of spaced holes through each of which a bolt 13 extends with a projecting portion to which an end of an insulator 14 is secured. To the other insulated ends of the insulators 14, a rigid metallic rectangular ionizer inner-frame, indicated in its entirety by the reference numeral 15, is fastened, there being four insulators arranged at the corners of a rectangle in the particular embodiment described, so that the inner-frame and parts associated therewith are insulated from the casing-frame and ground-electrodes, The ionizer inner-frame 15 comprises end connecting-bars 16, paralleling the associated end ground-electrode 8', having straight central supporting-portions provided with bayonet slots for engaging tightenable bolts 17 screwing into the insulated ends of the insulators 14, and ends 18. The ends 18 of each connecting-bar 16 are turned toward the ground-electrodes but are adequately air-insulated therefrom. The ionizer inner-frame further comprises a pair of outer insulated bars in the form of channels 19, each paralleling a casing-frame side 3, and of a slightly less length so that its end-tips are slightly spaced and air-insulated from the outer casing-frame 2. The connecting-bars 16 centrally support projecting bars 20 to the ends of which an additional insulated channel 21, similar to the channels 19, is secured so as to lie parallelly between them.

The channels 19 and 21 support arms which, in turn, support, position and limit the vibration of the ionizing wires of the dust-charging means. These arms, in the preferred embodiment, are constructed in accordance with the invention of E. W. Yungman, application Serial No. 505,423, filed concurrently herewith.

In Fig. 3, many arms have been broken away or omitted entirely for clarity of illustration, but an arm 25 is secured to each channel 19 in each space between consecutive ground-electrodes, including curved-portions 10, so that an ionizing-wire 9 can be strung between an arm 25 on one outer channel 19 and another arm 25 transversely aligned therewith on the other outer channel 19; there being an intermediate arm 26 on the channel 21, having an eye or hook 27 for positioning the mid-span of the ionizing-wire and for limiting its vibration.

For suitably ionizing the end-spaces along the casing-frame sides 3, the latter are provided with integral curved-portions 28. The end-tips of each channel 19 support relatively short arms 29, having sinuously formed wire-supporting ends to which ends of an ionizing-wire 30 are secured, the wire being in discharging relation to a curved-portion 28 along its length. For limiting vibration of the ionizing-wires 30, each channel 19 also supports a plurality of spaced intermediate arms 31 having hooks which engage intermediate portions of the wire for positioning it and damping its vibrations.

The downstream corners of the casing-frame 2 have a plurality of apertured angular brackets 32 secured thereto.

Figure 8:
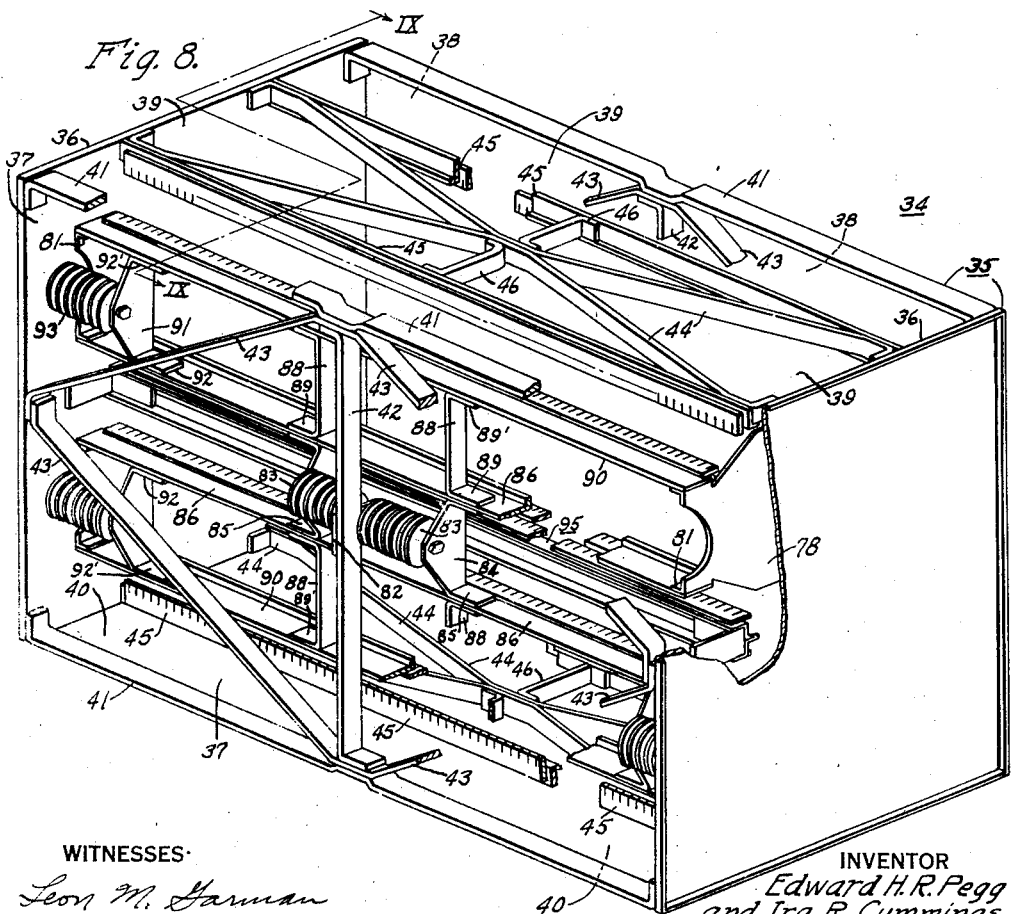
Fig. 8 is a perspective view of a dust-precipitator unit built in accordance with our invention, with the dust-precipitating plate-electrodes and other parts omitted or broken in order to more clearly illustrate the construction.

A dust-precipitator unit, in accordance with our invention, is indicated in its entirety in Fig. 8 by the reference numeral 34, and comprises, as assembled, a rigid rectangular frame 35 having two opposite closed rigid end-sides 36 in the form of outwardly flanged rectangular plates, and four open faces or sides 37, 38, 39 and 40. The closed frame-sides 36 stand upright, forming two sides of a gas-stream path, so that gas flows horizontally in through one open frame-side 37 and out through the opposite open frame-side 38, as indicated by the arrows in Fig. 9. The top and bottom frame-sides 39 and 40, respectively, are left open so that a washing or treating fluid can pass therethrough.

The two open-gas-flow frame-sides 37 and 38 are alike, each comprising a pair of peripheral-edge flat bars 41, between the end-sides 36, a central flat cross-bar 42, between the bars 41, and corner diagonal flat brace-bars 43; the bars being joined together and to the end-sides 36 to provide a rigid open-work structure with its bars edgewise to the gas-flow direction.

The top and bottom open sides 39 and 40 are also alike, each including a centrally-disposed open-work structure comprising an X-brace 44, extending between and secured to the frame end-sides 36, spaced parallel bars 45, secured to the X-brace 44 and of substantially the same length, and central brace-bars 46. The bars 45 are specially formed for positioning ground plate-electrodes of the dust-precipitating means, and will be subsequently described in greater detail.

The open-work structures and the end-sides of the frame impart form, shape and rigidity thereto.

The frame 35 symmetrically supports two sets of similar dust-precipitating means, each functionally complete, and arranged side by side inside the frame transversely of the gas-flow as closely as practical to its open-work structures; a dust-precipitating means 59 (Figs. 9 and 11) being above a dust-precipitating means 60.

Each dust-precipitating means comprises two series of relatively uninsulated plate-electrodes 61 and relatively insulated plate-electrodes 62, the respective plate-electrodes being generally alike and provided with flat dust-collecting surfaces, within close manufacturing tolerances.

Heretofore, standardized unit-parts of prior electrical dust-precipitators used plate-electrodes of relatively stiff aluminum or iron-plate which, in the size of plate-electrodes of about 100 square inches, more or less, were heavy enough to easily retain their shapes when evenly flat. Aluminum is especially desirable because it resists corrosion and can be die-cut to form and then strain annealed under heat and pressure, after die-cutting, to impart working flatness for providing a practicable uniform precipitating field.

An important feature of our invention resides in providing plate-electrodes of thin sheet-metal which may be protectively coated steel, for example. Terneplate is satisfactory and other protectively coated sheet-metal can be used, for example, sheet-steel coated with lead or zinc or otherwise protectively coated. Heretofore, the required flatness could not be imparted to die-coated sheet-steel plate-electrodes because the strain-relieving, annealing heat would ruin the protective coating. Our new plate-electrodes need not be annealed, and sufficient rigidity is imparted by using a few small strengthening ridges properly formed and placed so as not to noticeably affect the dust-precipitating electrostatic field, and still allow for a maximum field space-factor in relation to the size of the plate-electrodes.

Each of the uninsulated or ground plate-electrodes 61 (Figs. 18 and 19) is formed to provide a generally flat substantially square central-portion 66 bounded by relatively small smoothly shaped stiffening ridges 67 which extend along free edges of the central-portion 66, and similar ridges 68 which separate the central-portion 66 from narrow integral generally flat longitudinal end-portions 69 lying in a common plate parallel to and spaced from the plane which encompasses the central-portion 66. The end-portions 69, in the embodiment shown, are disposed lengthwise longitudinally along the direction for gas-flow.

Similarly, all of the insulated or high-voltage plate-electrodes 62 (Figs. 16 and 17), except the extreme end ones, are alike, being formed to provide a generally flat body- or central-portion 70 bounded by a pair of opposite ridges 71 and a second pair of opposite ridges 72, these ridges corresponding in shape and disposition to the ridges 67 and 68. The ridges 71 are between the central-portion 70 and narrow transverse flat end-portions 73, and the ridges 72 are between the central-portion 70 and narrow longitudinal flat end-portions 74. The end-portions 73 and 74 lie in a common plane paralleling that of central-portion 70, but spaced therefrom the same distance that the end-portions 69 are spaced from the central-portion 66 of the ground plate-electrodes 61.

The four corners of the high-voltage plate-electrodes 62 are cut away, as indicated by edges 75, at a substantially 45° angle to an extent sufficient to permit corners 76 of the ground plate-electrodes 61 to project outwardly therefrom, in a manner which will be understood by reference to the broken dotted line shown in the upper part of Fig. 16, which represents part of a ground plate-electrode 61 in assembled relation to the high-voltage plate-electrode 62. The edges 75 barely trim the central-portion 70, and provide adequate air-insulation therefrom to the spacing and positioning bars for the ground plate-electrodes, which engage the corners 76 thereof.

Corners of each transverse end-portion 73 of the insulated plate-electrodes are notched slightly to provide right-angular notches or corner cutouts 77, for receiving the insulated plate-electrode spacing and positioning bars.

The end-portions 69 and 74 of the different plate-electrodes are only slightly different in width and the central-portions 66 and 70 have the same general square-size so that substantially the entire ground plate-electrode, except for its small corners 76 and the slight overlap of its end-portions 69, is provided with a facing surface of a high-voltage plate-electrode for establishing the dust-precipitating electrostatic field, so that the space-factor of the electrostatic field bounded by opposite electrode-surfaces is large compared to the plate-electrodes themselves.

The plate-electrodes are made by first die-cutting coated sheet-iron into blanks of proper shape for the respective plate electrodes, and then die-forming the ridges on each blank. All ridges are formed in a blank preferably in a single operation, by cooperating dies having flat pressure surfaces for receiving between them the flat central- and end-portions of the plate-electrodes.

The end high-voltage plate-electrodes 78 are different from the other high-voltage plate-electrodes, and are made of heavier stock for stiffness, being longer than the intermediate high-voltage plate-electrodes 62 but of about the same width. As shown in Figs. 21 to 23, each comprises a substantially flat portion, which may be said to be generally octagonal, and a pair of end-portions 79 projecting from a pair of opposed sides of the octagon; each end-portion being cut-out along a curved portion 60, and having a pair of turned apertured end lugs 81.

The dust-precipitating sets 59 and 60 are novelly supported within a frame so that the frame size is minimized. To this end, certain of the bars of the open-work structures in the open frame-sides, namely the bars 45, serve as positioning and supporting means for the ground plate-electrodes, and others support insulators for insulatedly supporting similar bars for the insulated plate-electrodes; other bars for the latter plate-electrodes being supported by insulators secured directly to the end-sides 36; all supporting means for the insulated plate-electrodes being disposed at or near the pair of open gas-flow frame-sides 37 and 38, and the supporting means for the ground plate-electrodes being disposed at or near the upper and lower open frame-sides 39 and 40. Structurally, therefore, each frame is generally symmetrical on opposite sides of central bisecting perpendicular planes. This should be borne in mind in the description.

The supporting means for the insulated plate-electrodes comprises a short offset anchor-plate 82 (Figs. 9, 10 and 11) secured to the central part of a cross-brace frame-bar 42. To each side of the anchor-plate 82 is secured an end of an insulator 83 to the insulated end of which is secured a short U-shaped cross-bar 84 having projecting legs 85 to which a pair of inner spacer-bars 86 are secured. U-shaped cross-bars 88, generally similar to the cross-bars 84, have legs 89 which are also fastened to the bars 86 on the sides immediately opposite the legs 85 of the cross-bars 84 at each frame-side, thereby providing aligned outer legs 89' to which additional outer spacer-bars 90 are secured. Each of the outer spacer-bars 90 is secured to aligned legs 89' of two bars 88 associated with the same edge-portion of a dust-precipitator unit. In the illustrative unit there are four cross-bars 84 and eight cross-bars 88.

In order to provide a more rigid support for the ends of the spacer-bars 86 and 90, a pair of U-shaped cross-bars 91 is provided near each corner of each end-side 34, each cross-bar having an inner leg 92 and an outer leg 92'. An outer spacer-bar 90 is secured to each pair of facing outer legs 92', and an inner spacer-bar 86 to a pair of facing inner legs 92. The central part of each cross-bar 91 is fastened to an insulator 93 partly fitting in the space bounded by the curved edge 80 of a high-voltage end plate-electrode 78, the other end of each insulator being secured to the associated end-side 36. The extreme ends of each of the spacer-bar 86 and 90 are secured to aligned lugs 81 of opposite end plate-electrodes 78 which are thereby supported in spaced relation to the end-sides 36 and form a dust-precipitating field therewith.

The four spacer-bars 86 and 90, which position one end of the high-voltage plate-electrodes of both sets of dust-precipitating means 59 and 60, are parallel, being disposed near a gas-flow frame-side substantially equally spaced transversely across the direction of gas-flow, and are of a length slightly less than the distance between end-sides 36 so as to provide adequate air-insulation thereto; and a duplicate construction comprising four other space-bars 86 and 90 and means for insulatingly supporting them, is provided near the opposite gas-flow frame-side for the other end of the high-voltage plate-electrodes; so that the height of a tier is kept to a minimum, and the insulators will not bar liquid-flow into the spaces of the plate-electrodes. The spacer-bars 86 and 90 are alike in structure, and one inner bar 86 and one outer bar 90 are associated with one side of a single dust-precipitating set.

The relatively uninsulated or ground plate-electrodes are positioned by means of the four bars 45 in the open frame-sides 39 and 40, and by a pair of opposite bars 95, there being two bars 45 in each of the open frame-sides 39 and 40 and a single bar 95 associated therewith in the corresponding portion of the dust-precipitator unit.

A bar 95 comprises (Figs. 12 and 13) an elongated bar-member 96 fabricated by bending for rigidity and strength, to provide a pair of spaced similarly-disposed parallel legs 97 joined, in effect by a body or central-portion 98 having a central partition abutment ridge 99 lengthwise projecting from the body 98 on the side opposite the legs 97.

To each leg 97 is secured a slotted strip or member 100, projecting beyond the body-portion 98 on the same side as the ridge 99, and having spaced slots 101 for receiving the ground plate-electrodes; each slotted member 100 having a substantially continuous portion which is secured to the associated leg 97 in any suitable manner, as, for example, by a plurality of spaced rivets, so that the slots in the two members 100 are transversely aligned.

The bar-member 96 is gas-impervious and is provided with end brackets 102 for securing the bar 95 to the end-sides 36. The length of a bar 95 is substantially the distance between the end-sides, and being disposed inward of the associated gas-flow frame-side adds strength and rigidity to the frame.

As indicated in Figs. 14 and 15, the spacer-bars 45 and the spacer-bars 86 and 90 are fabricated in a manner similar to that for fabricating the bar 95. The bar 45 comprises an elongated solid angle-bar or -iron having a pair of legs 103 and 104 transversely at right angles. One leg 103 has secured thereto a slotted strip 105 having its slots projecting beyond the leg 104, so that the slotted strip 105 is transversely in right-angular relation to this leg 104 along its length. The strip, per se, is flexible but is, in effect, made rigid by using a sufficient number of securing points to secure it to a leg. The bars 86 and 90 each comprises an elongated solid angle-bar having a pair of legs 106 and 107 transversely at right angles. One leg 106 has secured thereto a slotted strip 108 having its slots projecting beyond the leg 106, so that the slotted strip 108 is transversely in right-angular relation to this leg 107 along its length.

Referring more particularly to Figure 2 in the assembled dust-precipitator unit a pair of bars 95 are centrally disposed with their partition abutment ridges 99 directed toward each other. The vertically inner corners 76 of the ground plate-electrodes 61 pass through the slots in the slotted members 100, fitting the angles between the ridges 99 and the central-portions 98 of the bars 95, with edges of the corners abutting the angle-sides. The ground plate-electrodes of one dust-precipitating set occupies one part of each bar 95 while those of the other set occupy the other part of the same bar on the other side of its partition ridge 99, so that each bar 95 separates the dust-precipitating sets and provides a baffle preventing gas-flow between the sets.

The vertically outer corners 76 of the ground plate-electrodes 61, close to the open frame-sides 39 and 40, are received in the slotted members 105 of the bars 45 which are disposed with legs 104 in abutting relation to the edges of the associated plate-electrodes, there being a bar 45 at each outer corner 76. Consequently, the ground plate-electrodes are positioned and supported by slotted bars 45 and 95 located respectively at the outer and inner corners thereof; the thin slotted strips 105 and 100 of these bars spacing the plate-electrodes and the rigid heavier stock of the bars, comprising legs 104 and portions 99, supporting them.

The insulated plate-electrodes 62 are somewhat similarly positioned and supported by bars 86 and 90 somewhat inside opposite gas-flow sides of the frame. The legs 107, associated with each side of a dust-precipitating set, face each other and fittingly abut the corner notches 77 of the high-voltage plate-electrodes, thereby providing fixed abutment means limiting edgewise movement of these plate-electrodes in any direction, while the slotted members 108 maintain them spaced.

With the frame supported as described, the weight of the plate-electrodes is, of course, borne by the relatively lower bars; but the construction is such that the dust-precipitating unit can be placed in any position without disturbing the plate-electrode arrangement.

*Gas-cleaning apparatus*

The dust-precipitating units 34 can be assembled side by side and in tiers after the manner shown in Fig. 1 in which a gas duct-means 110 is shown as of an arbitrary size for receiving four such units which are supported above the lower wall or floor 111 of the gas duct-means by supporting channels 112; adjacent end-sides 36 and bars 41 of adjacent frames being secured together by any suitable means, with caulking used between abutting end-sides 36, if necessary. In one particular installation, each frame was about 36 inches wide, about 24 inches high and about 19 inches in the direction of gas-flow; the plate-electrodes 61 and 62 being .020 protectively coated steel sheet, with the ground plate-electrodes about eleven inches high and about nine inches in the direction of gas-flow, the steel sheet before being provided with ridges having such flexibility for bending that it could not be used satisfactorily for plate-electrodes, but amply stiff when provided with ridges about ⅜" high.

A liquid distributing means, shown as a compartment 113, is built into the gas duct-means above the frames, having a perforated bottom wall 114. One or more supply pipes 115 are provided to which treating liquid is supplied to the compartment 113, the liquid flowing through the apertures in the wall 114 and over the plate-electrodes and other parts of the dust-precipitating units, the relatively upper and lower open frame-sides of which permit the liquid to flow downwardly through all of the units for flushing or otherwise treating the plate-electrodes. The discharged liquid flows to the bottom wall 111 which may be sloped to a drain. Suitable gas-flow baffles may be provided to direct the gas-flow into the gas-cleaning means.

The dust-charging units 1 are secured to the upstream sides of the dust-precipitating units 34 by means of the brackets 32 on the ionizer casing-frame 2 and similar brackets on the frames, the brackets being geometrically arranged in a predetermined pattern on each so that they mate. If desired, a pair of ionizer casing frame-sides can be elongated so that a single dust-charging unit may be associated with more than one dust-precipitator frame, say, for example, two horizontal frames or two vertical frames, to further strengthen the assembly.

While we have shown and described our invention in a form now preferred, it is obvious that numerous details, subassemblies and features thereof are subject to modification.

We claim as our invention:

1. An apparatus for an electrical precipitator system of a type described, comprising the combination of a gas-duct for a gas-stream to be cleaned; a plurality of individual substantially similar dust-precipitator units fixedly superposed in a tier in said gas-duct, each comprising a substantially rigid frame, a plurality of plate-electrodes, and means for upstandingly supporting said plate-electrodes inside the associated frame in spaced alternately relatively insulated and uninsulated relation; contiguous frames having substantially fitting, generally horizontally extending, upper and lower open sides; each frame having a pair of open sides, including an upstanding side, through which gas may respectively enter and leave; and means for discharging a cleaning liquid into an upper one of said contiguous frames for treating the plate-electrodes thereof with a liquid, whereby treating liquid can flow downwardly into a relatively lower one of said contiguous frames for treating its plate-electrodes.

2. An apparatus including that of claim 1, and characterized by both of said gas-flow open sides being upstanding, and the last said means comprising liquid-discharge means at the top of said tier above the general gas-flow path, for discharging a liquid downwardly into said tier.

3. A precipitating apparatus comprising the combination of a plurality of individual substantially similar dust-precipitator units fixedly assembled superposed in a tier, each of said dust-precipitator units comprising a substantially rigid frame, a plurality of plate-electrodes, and insulated and uninsulated bar means associated with each frame for upstandingly supporting said plate-electrodes in the associated frame in spaced alternately relatively insulated and uninsulated relation; contiguous frames having substantially fitting, generally horizontally extending, upper and lower open sides; each frame having upstanding open sides through which gas may respectively enter and leave; each of said frames having end-sides extending in the direction for gas-flow; insulators anchored to said end-sides on the upstream and downstream sides of said plate-electrodes, for supporting and positioning said bar-means for the insulated plate-electrodes at said upstream and downstream sides thereof; and means for discharging a cleaning liquid into the top of said tier for cleaning said plate-electrodes.

4. For an electrical precipitator system for cleaning a longitudinal gas-flow, a separate structural item comprising, a plurality of plate-electrodes, a frame within which said plate-electrodes are supported, said frame being bounded by a plurality of open sides and a pair of opposed rigid end-sides, said frame comprising means including a plurality of bars, extending between said end-sides for imparting shape and rigidity to the frame, at least one of said open sides comprising a bar and having a plurality of inner spaced slots for receiving edges of at least some of said plate-electrodes.

5. A portable electrical dust-precipitator unit of a type adapted to be produced in quantity, comprising a generally rectangular frame bounded by four open sides and a pair of opposed rigid end-sides, said frame including an outer open-work structure at each of said open sides, anchored to said end-sides, extending therebetween for imparting rigidity and shape to the frame; a precipitating means comprising a plurality of alternately relatively insulated and uninsulated spaced plate-electrodes; and slotted bar-means associated with said frame for supporting said plate-electrodes substantially parallel to said end-sides entirely within the space formed by said open-work structures.

6. The dust-precipitator unit of claim 5 characterized by said precipitating means being divided into two separate sets, the sets being closely juxtaposed, and a unitary bar between said sets, having opposite slotted portions respectively receiving the plate-electrodes of one or another of said sets, said bar having a partition-means between its slotted portions for separating the plate-electrodes of the respective sets.

7. An electrical dust-precipitator means comprising, in combination, a plurality of spaced alternately relatively insulated and uninsulated polygonal plate-electrodes and supporting means therefor; the relatively uninsulated plate-electrodes being substantially rectangular, each comprising small stiffening ridges paralleling a pair of opposite plate-edges to provide a pair only of substantially flat longitudinal end-portions and a first substantially flat generally square central-portion in substantially parallel planes; the relatively insulated plate-electrodes each comprising small stiffening ridges, similar to the aforesaid ridges, providing a body-portion substantially duplicating said first central-portion, the size of said insulated plate-electrodes being such that its ridges provide substantially flat transverse end-portions protruding beyond the uninsulated plate-electrodes, and substantially flat longitudinal end-portions geometrically somewhat similar to but slightly narrower than the longitudinal end-portions of the uninsulated plates, the end-portions of said insulated plate-electrodes being in a plane substantially paralleling that of said body-portion, but spaced therefrom a distance generally corresponding to the spacing of the first said planes, the corners of said insulated plate-electrodes being cut away so that corners of said uninsulated plates protrude therefrom.

8. The electrical precipitator-means of claim 7 characterized by a frame having a pair of opposite closed sides, and a plurality of slotted bars for supporting said plate-electrodes within the frame by engaging said protruding corners of said uninsulated plate-electrodes and by engaging the said transverse end-portions of said insulated plate-electrodes.

9. A portable electrical dust-precipitator unit comprising, in structural combination, a frame having a pair of closed end-sides and an open side including an open-work structure; a plurality of distinct dust-precipitating means in edgewise juxtaposition, each comprising a plurality of plate-electrodes; a plurality of bars for spacing and supporting said plate-electrodes inside said frame, insulator-means anchored to one of said end-sides, said insulator-means having ends of a pair of said bars, associated with one of said dust-precipitating means, anchored thereto; said open-work structure comprising a central brace-bar; insulator-means anchored to said brace-bar, the last said insulator-means having intermediate portions of a pair of bars, each associated with a different one of said dust-precipitating means, anchored thereto.

10. An electrical dust-precipitator means for a gas-flow comprising a plurality of spaced polygonal plate-electrodes; a plurality of bars having slots in which edges of said plate-electrodes are received for spacing and positioning them; said plurality of plate-electrodes comprising a pair of spaced plate-electrodes each having a unitary bent-over lug at an edge thereof to which one of said bars is secured.

11. An electrical dust-precipitator means for a gas-flow comprising a plurality of spaced alternately insulated and uninsulated polygonal plate-electrodes; a plurality of insulated bars having means for spacing and positioning the insulated plate-electrodes; separated insulated end plate-electrodes being rigid and having lugs unitary with edges thereof to which ends of said bars are fastened.

12. In an electrical device of a class described, the sub-assembly comprising a plurality of series of spaced polygonal plate-electrodes, an elongated bar comprising a central main-portion and separate lengthwise side-portions projecting beyond said main-portion, each of said side-portions being provided with a plurality of spaced slots along the length thereof, a first series of said plate-electrodes having edges received in the slots of one side-portion, and a second series of said plate-electrodes having edges received in the slots of the other side-portion.

13. The sub-assembly of claim 12 characterized by said main-portion being provided with a lengthwise intermediate projecting means between said side-portions for separating said first series from said second series of said plate-electrodes.

14. Plate-electrode spacing means for an electrical dust-precipitator, comprising an independently-made unitary angular bar for positioning a plurality of closely-spaced plate-electrodes in an electrical device of a class described, comprising a plurality of elongated bar-parts relatively narrow in width and comparatively considerably thinner than wide; a pair of said bar-parts extending lengthwise in substantially parallel planes; and a transverse bar-part interconnecting said pair of bar-parts in angular relation therewith, at least one of said pair of bar-parts being slotted along its length for receiving plate-electrodes.

15. A dust precipitating-electrode for a device of the class described, comprising a metallic sheet having strengthening ridges therein providing a substantially rectangular substantially flat central-portion, bounded by the ridges, and a substantially flat end-portion on each of a pair of opposite sides of the central-portion, said end-portions lying substantially in the same general plane, said central-portion lying generally in a plane which is spaced from but generally parallel to the first said plane.

16. An interchangeable structural unit adapted to form an electrostatic gas-cleaning equipment with a plurality of similar units arranged side by side, said unit comprising a generally rectangular prismatic frame having outer substantially rigid structural members imparting form and rigidity thereto, said members comprising fixed open-work structures providing a pair of opposite open fluid-pervious outer frame-sides, and a second pair of opposite open fluid-pervious outer frame-sides, said members also comprising means forming end frame-sides, said frame being fluid-pervious between said pairs of fluid-pervious frame-sides, a plurality of spaced alternately relatively insulated and uninsulated plate-electrodes, and means associated with said frame-sides for supporting and positioning said plate-electrodes entirely within said frame substantially across the path for a gas flow through one of said pairs of opposite fluid-pervious frame-sides and the spaces between said plate-electrodes, the other pair of opposite fluid-pervious frame-sides being of an extent in the direction for gas-flow to more than span said plate-electrodes.

17. An interchangeable structural unit adapted to form an electrostatic gas-cleaning equipment with a plurality of similar units arranged side by side, said unit comprising a generally rectangular prismatic frame having outer substantially rigid structural members imparting form and rigidity thereto, said members comprising fixed open-work structures providing a pair of opposite open fluid-pervious outer frame-sides and a second pair of upstream and downstream open fluid-pervious outer frame-sides, said members comprising means forming end frame-sides, said frame being fluid-pervious between said pairs of fluid-pervious sides, a plurality of spaced alternately relatively insulated and uninsulated plate-electrodes, and means associated with said frame-sides for supporting and positioning said plate-electrodes entirely within said frame, substantially across the path for a gas flow through said upstream and downstream frame-sides and the spaces between said plate-electrodes, the other pair of opposite fluid-pervious sides extending beyond both sides of said plate-electrodes in the direction of gas-flow, the last said means comprising insulated slotted members solely at the upstream and downstream edges of said plate-electrodes with respect to said path, supported by said end frame-sides and the open-work structures of said upstream and downstream frame-sides, for completely supporting and positioning the insulated plate-electrodes.

18. An interchangeable structural unit adapted to form an electrostatic gas-cleaning equipment with a plurality of similar units arranged side by side, said unit comprising a generally rectangular prismatic frame having outer substantially rigid structural members imparting form and rigidity thereto, said members comprising fixed open-work structures providing a pair of opposite open fluid-pervious outer frame-sides, and a second pair of opposite open fluid-pervious outer frame-sides, said members also comprising means forming end frame-sides, said frame being fluid-pervious between said pairs of fluid-pervious frame-sides, a plurality of spaced alternately relatively insulated and uninsulated plate-electrodes, and means associated with said frame-sides for supporting and positioning said plate-electrodes entirely within said frame substantially across the path for a gas flow through one of said pairs of opposite fluid-pervious frame-sides and the spaces between said plate-electrodes, the other pair of opposite fluid-pervious frame-sides spanning the spaces between said plate-electrodes, the last said means comprising insulated slotted members solely at the upstream and downstream edges of said plate-electrodes with respect to said path, for completely supporting and positioning the insulated plate-electrodes, and slotted members at the other edges of said plate-electrodes and at the said downstream and upstream edges of said plate-electrodes for the uninsulated plate-electrodes.

19. Apparatus of a type described, for removing foreign particles from a flowing gas, comprising a plurality of structurally independently mating dust-precipitator units superimposed in a tier, each of said dust-precipitator units comprising a generally rectangular prismatic upright fluid-pervious outer pair of opposite upright fluid-pervious outer faces, a second pair of opposite substantially horizontal fluid-pervious outer faces and end-sides, said faces and end-sides comprising substantially rigid members imparting form and rigidity to said frame, a plurality of upright spaced alternately relatively insulated and uninsulated plate-electrodes, and means for supporting and positioning said plate-electrodes within said frame between and substantially parallel to said end-sides, in the path for a gas-stream, said upright opposite outer faces comprising a gas-entering side and a gas-exit side for the gas-stream, and means for causing a liquid to be discharged for passing through the said second pairs of opposite faces, whereby to clean said plate-electrodes.

20. A portable dust-precipitator unit for an electrical dust-precipitator system, comprising, in combination, an outer substantially rigid frame having outer open gas-flow sides comprising substantially rigid open-work bar-structures, a plurality of polygonal plate-electrodes paralleling the gas-flow, and means for insulatedly spacing and supporting said plate-electrodes inside said frame, said means comprising insulators and bars solely at the upstream and downstream sides of said plate-electrodes, said frame having another outer open side facing and spanning the spaces between said plate-electrodes.

21. The invention of claim 20 characterized by said plate-electrodes having edges near the last said outer open side.

EDWARD H. R. PEGG.
IRA R. CUMMINGS.